No. 850,655. PATENTED APR. 16, 1907.
E. J. JUDGE.
PROCESS OF PEELING FRUITS AND VEGETABLES.
APPLICATION FILED JAN. 21, 1907.
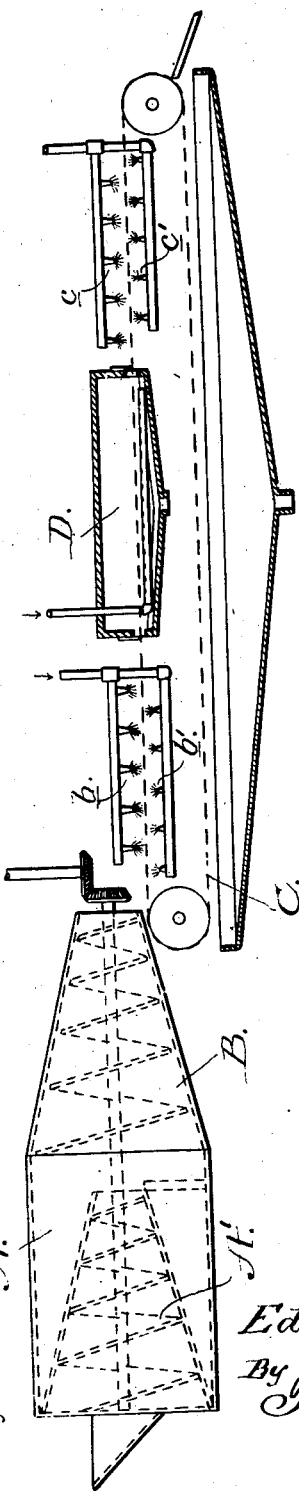
Inventor
Edward J. Judge
By T. Walter Fowler
his Attorney
Witnesses
C. H. Walker
H. L. Byrne

UNITED STATES PATENT OFFICE.

EDWARD J. JUDGE, OF SAN FRANCISCO, CALIFORNIA.

PROCESS OF PEELING FRUITS AND VEGETABLES.

No. 850,655. Specification of Letters Patent. Patented April 16, 1907.

Application filed January 21, 1907. Serial No. 353,349.

*To all whom it may concern:*

Be it known that I, EDWARD J. JUDGE, a citizen of the United States, residing at San Francisco, in the county of San Francisco and State of California, have invented new and useful Improvements in Processes of Peeling Fruits and Vegetables, of which the following is a specification.

My invention relates to a new and useful process of peeling fruit and vegetables by subjecting them to the action of a chemical or heat and chemical, whereby the skins are first loosened from the meat and then removed by the force of opposed jets of water, steam, or air, after which the peeled fruits or vegetables are subjected to the action of washing and blanching operations to eliminate the remaining traces of chemicals and to bring out the natural color of the fruit or vegetable if the fruit or vegetable is under-ripe.

The essential objects of the present invention are to provide a simple and effective process for quickly removing the skins from fruits and vegetables in a commercial manner and to sterilize the peeled fruits or vegetables and prepare them for the subsequent operation of canning.

The drawing illustrates diagrammatically one form of apparatus by which my process may be carried out.

My process is applicable to all sorts of fruit—such as peaches, apricots, pears, &c.—and vegetables, such as tomatoes, beets, and the like. Drupaceous fruits, such as peaches and apricots, are usually pitted before being subjected to my process, this pitting being done by any of the methods now employed for this purpose and usually after the fruit has been graded as to size, variety, and condition. In giving out fruit to operatives for halving and pitting or to pitting-machines the largest size and best fruit should be first given, to be followed by lower grades in sequence.

The operatives usually make five (5) grades—viz., perfect green fruit, imperfect green fruit, ripe and sound perfect fruit, ripe imperfect fruit, and pie or lowest grade of fruit.

The method usually adopted in such grading is to supply each operator with as many small boxes or receptacles as there are grades of fruit, each of said boxes holding about one-half peck of fruit and each box receiving fruit of one grade only.

When the boxes are filled, each grade is collected and dumped into suitable receptacles holding, say, from forty (40) to sixty (60) pounds. These receptacles are carried to a suitable point or station, and the fruit is subjected to my process for the purpose of having their skins removed.

The fruit being prepared in the manner stated, the high grade is preferably first treated, then the succeeding lower grades, leaving the lowest grade to the last. This is because the sound green fruit usually requires a greater length of treatment at certain stages in the process than the soft ripe fruit, so that by the time the higher grade has been treated the solution which I use in my process, as I will presently explain, is about right for the next lower grade of fruit.

Whatever the grade of fruit said fruit—halved in the case of drupaceous fruits—is dumped into a tank A, containing hot water and a spiral conveyer A' or other means for advancing the fruit therethrough. In this bath the fruit is heated and more or less softened. In this heated condition the fruit is finally delivered out of the hot-water bath and immediately dumped into a tank B, containing a heated solution, as caustic soda, which attacks the skin of the fruit and breaks and loosens the same. The solution-tank B should have means for causing the fruit to be advanced therethrough and to be finally delivered out of the tank and upon a conveyer C, which in practice is best made of some open-work or reticulated form and having an endless travel over suitably-placed drums at the ends, said carrier being driven at any appropriate speed and from any desired point and source of power.

The skin of the fruit having been loosened by the action of the solution or the hot water and solution is next brought in a layer one deep into the range of action of appropriate opposed jets $b$ $b'$ of water, steam, or air, which impinging with more or less force upon all sides of the fruit forcibly remove the now loosened skins piece after piece and thoroughly rinse the peeled fruit. The extent of spraying will of course depend upon the condition of the fruit being treated, because if the fruit is overripe it can stand less spraying and less force from the jets than when the fruit is greener or firmer; but in any event the force of the jets will be so regulated that while sufficient for all peeling and cleansing purposes it should not be sufficient to tear or mutilate the meat.

The extent of the zone wherein the fruit is subjected to the sprays is sufficient for all peeling and washing purposes. In fact, the amount of scalding, solution, and spraying is governed by the condition of the fruit, as one variety will require more than another. This, however, the operator learns by experience. The strength of the solution in the tank B varies with the fruit, as does the amount used in a stated time. When the skin is sufficiently loosened to allow of the sprays removing the same from the meat, that is the proper degree, and it should be maintained at that point.

Having thus peeled the fruit by the combined action of the solution and fluid jet means, I next subject the peeled fruit to the action of a steam-bath for the purpose of sterilizing the fruit and blanching or further softening it to bring out the natural color and cause it to hold that color. That this step in the process may be carried out I cause the conveyer with its peeled fruit to traverse a steam box or chamber D, wherein the fruit is acted on by the steam for the purposes stated. From the steam box or chamber the now peeled and sterilized fruit is brought into the range of action of a second series of opposed jets $c$ $c'$ of cool or cold water for the purpose of cleansing the fruit and removing therefrom any particles of skin that may have remained thereon and to cool the fruit. The fruit is now ready for the can, having been thoroughly washed, peeled, and sterilized, so that it is absolutely clean from a sanitary point.

It is well recognized in the art of canning that the condition of the fruit received from the growers governs the quality produced. In the case of peaches, for instance, if they are sound, ripe, and free from blemishes there will be but a small amount of waste and very little labor necessary; but if the fruit is decayed, scaly, or full of fungous growths it will require more labor in grading, peeling, and removing such blemishes. Consequently the great advantage of my process over the hand method lies in the saving of labor, peeling, and size. The saving in labor varies according to the amount paid for handwork, but has averaged ten cents per fifty pounds of fruit. In peeling by hand the waste in peeling amounts to about twelve and one-half pounds to fifty pounds of fruit, or approximately twenty-five per cent. There is also the saving in size of the fruit. A two and one-quarter inch peach when peeled by hand will not measure more than two inches on an average. When peeled by my process, the peach comes out approximately its original size, (if the fruit is properly graded, as before explained.) By thus retaining the size of the fruit a higher grade of canned product is obtained, as the low grades are always the smaller in size. Also by removing only the thin film representing the peel those properties of the fruit which lie nearest the skin and contribute so largely to the natural taste of the fruit are retained, thus improving the eating qualities of the canned product.

The three essential points, therefore, of saving in labor, peeling, and size are important in estimating the economies of my process over the hand method.

The operation on vegetables is substantially the same as on fruits. If vegetables like tomatoes are sound and free from blemishes, they come out peeled and whole, it being understood that the amount of solution in the tank B, the force of the sprays, and the extent of steaming after spraying is governed by the condition of the tomatoes or other vegetable or fruit undergoing treatment.

Having thus described my invention, what I claim as new, and desire to secure by Letters Patent, is—

1. The process herein described of peeling fruits and vegetables which process consists in subjecting the fruit or vegetable to a bath of skin-disintegrating solution for the purpose of loosening the skin thereof; then passing the fruit across the range of action of fluid sprays of sufficient force to remove the loosened skin; and then subjecting the peeled product to a steam-bath for the purpose of removing any remaining traces of solution and to blanch said product.

2. The process herein described of peeling fruits and vegetables said process consisting in subjecting the fruit or vegetable to successive baths of hot water and a skin-disintegrating solution for the purpose of softening the fruit and breaking the skin thereof; then passing the fruit or vegetable into the range of action of opposed fluid sprays of sufficient force to remove the loosened skin; and then subjecting the peeled fruit or vegetable to a steam-bath for the purpose of eliminating any remaining traces of solution and to blanch said fruit or vegetable.

3. The process herein described of peeling fruits and vegetables said process consisting of the subjection of the fruit or vegetable to a bath of hot water and then to a bath of skin-disintegrating solution whereby the fruit or vegetable is washed and softened and its skin broken and loosened; then passing the fruit or vegetable into the range of action of opposed hydraulic sprays of sufficient force to detach the loosened skin; then steaming the peeled fruit or vegetable to eliminate any remaining traces of solution and to blanch the fruit or vegetable; and, finally, subjecting the fruit or vegetable to the action of hydraulic sprays of substantially low temperature.

In testimony whereof I have hereunto set my hand in presence of two subscribing witnesses.

EDWARD J. JUDGE.

Witnesses:
C. W. FOWLER,
T. W. FOWLER.